T. ALLISON.
Straw Cutter.
No. 10,001.
Patented Sept. 6, 1853.
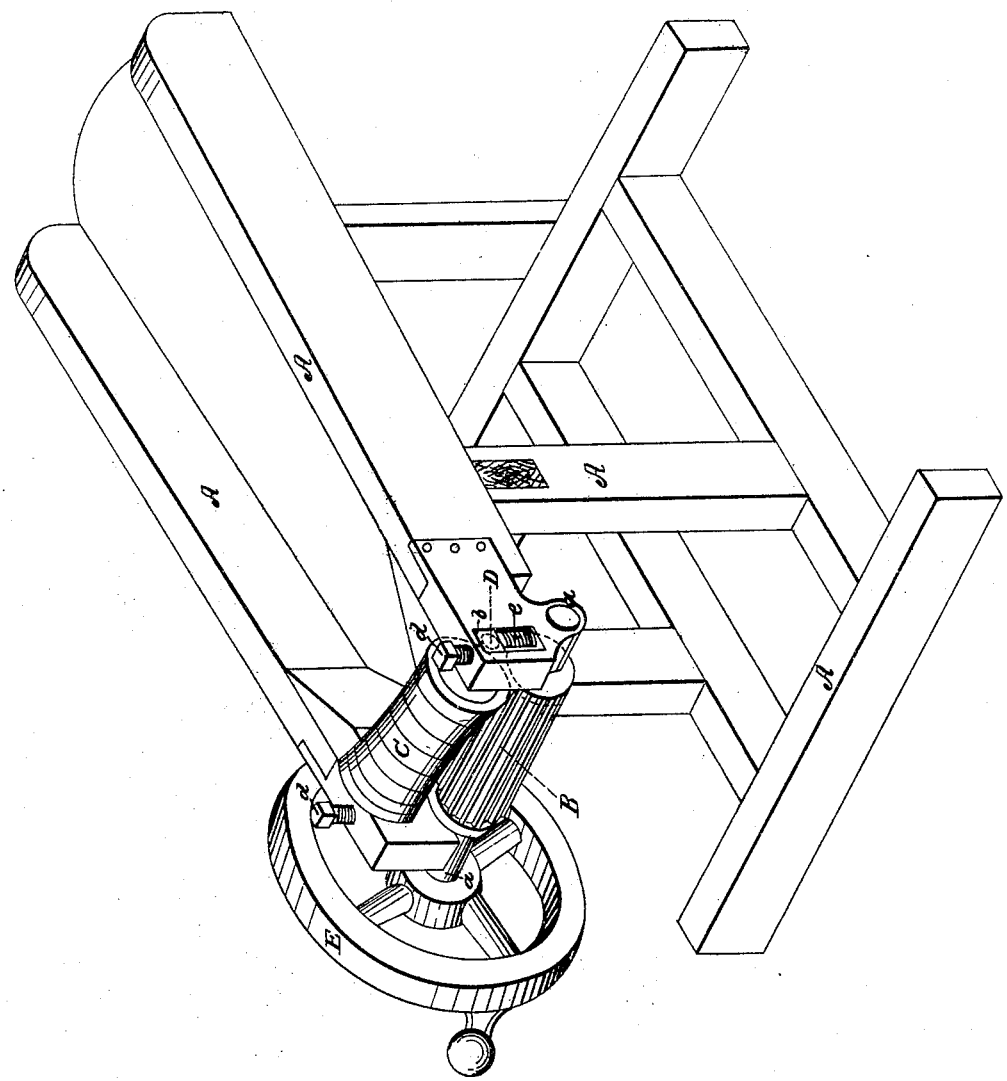

UNITED STATES PATENT OFFICE.

THOS. ALLISON, OF MILTON, NEW YORK.

STRAW-CUTTER.

Specification of Letters Patent No. 10,001, dated September 6, 1853.

*To all whom it may concern:*

Be it known that I, THOMAS ALLISON, of Milton, in the county of Ulster and State of New York, have invented a new and useful Improvement in Straw-Cutters; and I do hereby declare that the following is a full, clear, and exact description of the same, reference being had to the accompanying drawings, forming part of this specification.

The nature of my invention consists in the employment of a peculiar shaped roller which has its axis set at an angle to the axis of the feed trough, in combination with a cylinder of straight knives which are set longitudinally around its periphery, the said roller serving by its position and shape to facilitate greatly the feed of the straw, and in such a manner as to cause the knives to operate upon the straw as effectually as if they were made spiral and set obliquely around the cylinder. Thus the great expense and trouble attending the use of spiral knives can be overcome, as well as the difficulty attending sharpening them, on account of their shape. The spiral knives are very expensive and cannot be made by any but skilful machinists. They are also very difficult to be sharpened, and often have to be sent to the first maker for this purpose. Whereas the knives I employ can be made by any smith and can be taken off and sharpened on any grindstone and by any one skilled in the art, and they only cost about one third as much as spiral knives and yet the cutting operation is as perfect as if it were done by a machine having spiral knives and a roller parallel with the axis of the feed trough.

The drawing exhibits a perspective view of a straw cutter with the feed roller set in an oblique position to, and over the cylinder of parallel or straight knives.

A, is the frame of the straw cutter.

B, is the cylinder of straight knives. This cylinder has its journals resting and turning in the bearings *a, a*.

C, is the obliquely arranged roller. The journals of the shaft D, of the same, resting in movable boxes *b*—which rest on springs *c*. By securing these journals in the movable sliding boxes the roller can be adjusted to any height and be kept in that position by springs *c* and set screw *d;* which screw serves to lower and raise the oblique roller. The springs upon which the movable boxes rest are secured in a slot or opening *e*, in which said movable journal box slides.

E, is the driving wheel.

The roller C, is made gradually tapering from its ends to its center in the line of a curve, as shown in the drawing, to accommodate itself to the position and shape of the knives. The shape of said roller and the manner in which it is arranged facilitating the feed of the straw and rendering the cutting operation more perfect and effectual.

I do not claim cutting straw in an oblique direction by means of spiral knives set obliquely around the periphery of a cylinder which has its axis set parallel with the axis of the feed trough, and which operate in combination with a parallel feed roller, but

What I claim as my invention and desire to secure by Letters Patent is—

The construction and arrangement of the adjustable feed roller C, which is made gradually tapering from its ends to its center or middle in the line of a curve, and arranged at an angle to the axis of the feed trough, and made to operate in combination with the cylinder of straight knives, and thereby facilitate the operation of the machine as herein fully set forth and described, this arrangement rendering the machine less expensive and more easy to be managed and kept in order.

THOS. ALLISON.

Witnesses:
JNO. C. HITCHCOCK,
SILAS E. HAIGHT.